United States Patent [19]

Giffin

[11] Patent Number: 5,078,026
[45] Date of Patent: Jan. 7, 1992

[54] BICYCLE PEDAL ORIENTATION DEVICE

[76] Inventor: Brian K. Giffin, P.O. Box 4057, Boulder, Colo. 80306

[21] Appl. No.: 477,298

[22] Filed: Feb. 8, 1990

Related U.S. Application Data

[63] Continuation-in-part of Ser. No. 293,294, Jan. 4, 1989, abandoned.

[51] Int. Cl.[5] .................................................. G05G 1/14
[52] U.S. Cl. ...................................... 74/594.4; 74/594.6
[58] Field of Search ............................... 74/594.1–594.6; 36/131

[56] References Cited

U.S. PATENT DOCUMENTS

| 578,183 | 3/1987 | Anderson | 74/594.6 X |
|---|---|---|---|
| 631,276 | 8/1893 | Bulova | 74/594.3 |
| 642,874 | 2/1900 | Park | 74/594.6 X |
| 3,788,163 | 1/1974 | Gause et al. | 74/594.6 |
| 4,103,563 | 8/1978 | Genzling | 74/594.6 X |
| 4,625,580 | 12/1986 | Burt | 74/594.3 X |

FOREIGN PATENT DOCUMENTS

| 121309 | 11/1900 | Fed. Rep. of Germany | 74/594.6 |
|---|---|---|---|
| 796362 | 4/1936 | France | 74/594.6 |
| 891873 | 3/1944 | France | 74/594.3 |
| 937354 | 8/1948 | France | 74/594.3 |
| 981161 | 5/1951 | France | 74/594.4 |
| 437086 | 6/1948 | Italy | 74/594.3 |
| 7713672 | 6/1978 | Netherlands | 74/594.6 |
| 5837 | of 1904 | United Kingdom | 74/594.4 |

Primary Examiner—Vinh T. Luong
Attorney, Agent, or Firm—Donald W. Margolis

[57] ABSTRACT

This device includes a cam which can be adjustably secured intermediate the pedal of a bicycle, which pedal is rotatably mounted on an axle, and the rotary crank of the bicycle to which the pedal axle is secured. The cam carries and defines at least one detent for mechanical engagement. The device also includes a latch mechanism which carries a pawl for releasably mechanically engaging the detentes carried by the cam. A mechanism is provided for normally biasing the pawl into engagement with the detent of the cam. Each of the detentes which is carried by the cam is designed to be located and positioned so that, in conjunction with the pawl, it can position the pedal in one or more desired orientation. One such preferred fixed orientation is with the upper surface of the pedal being horizontal, that is "up," when the crank is in a substantially top dead center position. A second preferred fixed orientation is with the upper surface of the pedal being "up," when the crank is in a substantially bottom dead center position. A mechanism is also connected to the latch to cause the disengagement of the pawl from the cam detent. When the pawl is disengaged from the cam detent, free rotation of the pedal on its axle relative to the rotary crank is permitted. The latch disengaging mechanism is activated when the foot of a cyclist is placed on the upper surface of the pedal.

11 Claims, 2 Drawing Sheets

BICYCLE PEDAL ORIENTATION DEVICE

RELATED APPLICATIONS

This application is a continuation-in-part of U.S. patent application Ser. No. 293,294, entitled "Orientation Device For A Bicycle Pedal" filed by Brian K. Giffin on Jan. 4, 1989 now abandoned.

BACKGROUND OF THE INVENTION a) Field of the Invention

The present invention relates generally to machine elements which are useful as pedal accessories and, more particularly, to accessories which are useful in conjunction with bicycle pedal toe clip devices. More specifically, the present invention relates to a mechanism for maintaining the orientation of a bicycle pedal which is in combination with a toe clip in such a manner as to provide ease of entry due to the prevention of the tipping of the pedal due to the weight of an associated toe clip.

b) Description of the Prior Art

In recent years, the technology relating to bicycle construction has become more refined. As a part of this refinement specific forms of bicycles have been devised according to the intended usage of the bicycle. Such forms include light weight racing bikes, rugged mountain bikes, conventional touring bikes and the like. With respect to bicycles intended to be used in sporting competition, such as racing, mountaineering and the like, it has constantly been the goal to design all parts of the bicycle in a manner which enhances the efficiency of the use of the energy of the cyclist and the efficiency of the bicycle. For example, the wheels of a racing bicycle are generally made as light and as thin as possible without weakening their strength to a point at which they will become unreliable. Additionally, such bicycle wheels are provided with structures which enable the wheels to be quickly removed and replaced in the case of tire or wheel damage.

By contrast, mountain bikes often have tires which are heavier, wider, and more textured than the tires which are normally used with touring or racing bicycles. In order to offset some of the increased weight gain, it is the practice to reduce the diameter of mountain bike tires. However, mountain bikes require as much clearance as possible between the pedals and the ground in order to prevent contact with various impediments, such as rocks, brush and the like. As a result, modern mountain bike frames have been designed in a manner which moves their bottom brackets upward. Moreover, in the use of such mountain bikes it is not unusual to start on uphill or uneven terrain, thus leaving much less time available to coast, without pedalling, while trying to insert a foot into a mis-oriented toe clip. If the rider misses on the first attempt and must pedal using the back side of the pedal, the toe clip itself may operate much like an open bucket, posing even greater potential problems of snaring rocks, shrubs and other items on the ground.

The pedals of all bicycles are intended to serve an extremely important function in coupling the muscle power of the cyclist to the drive system of the bicycle in such a way as to most efficiently propel the bicycle. Therefore, the arrangement and the construction of the pedals are designed so as to enhance, as much as possible, the efficiency of energy transfer from the cyclist to the bicycle drive system. However, as is explained in more detail below, two primary conditions for achieving maximum efficiency and minimum loss of time in present bicycle designs are generally not satisfied by pedal arrangements which are in use in most high performance and competition bicycles.

As is well known, a pair of diametrically opposed rotary cranks are mounted on a common axle which is fixed to a sprocket gear and supported by the bicycle frame. An outwardly projecting axle is secured to the outer distal end of each rotary crank. A bicycle pedal is mounted on each such axle. Each pedal is freely rotatable with respect to the axle on which it is mounted, usually with races of ball bearings being utilized to enhance its ability to rotate. In use, a rider exerts pressure on one or both bicycle pedals to cause the rotary cranks to rotate. With each revolution of each rotary crank the pedal and axle which are associated with that crank also rotate one with respect to the other through one complete revolution. The rotary crank causes the sprocket gear to rotate, which in turn drives a bicycle chain, which then in turn drives a relatively smaller sprocket gear, which causes the drive wheel of the bicycle to rotate. During this entire power transmission operation, the bicycle pedal, which is free to rotate with respect to the axle on which it is mounted and connected to the crank, is maintained in a substantially horizontal attitude at all times by the foot of the cyclist.

In more sophisticated bicycles and in competition bicycles, in order to perfect the connection between the pedal and the foot of the cyclist, each pedal is generally provided with a "toe clip" mechanism. Such a toe clip mechanism normally includes two components. The first component of a toe clip is a toe piece which is designed to limit the forward motion of the riders foot so that it will not slide forward off of the pedal. Typically, this first component is fastened to the leading edge of the pedal and extends forward thereof far enough to accommodate the toe of the shoe of the cyclist. From there it curves upwards around what will be the location of the toes of the foot of a rider, and ends in a connecting element, such as a loop, which is far enough above the beginning of the instep to accommodate the foot of the cyclist. The second component of a toe clip is an adjustable strap which is threaded through the connecting element of the first component which is located above the instep, and then through the pedal. The second component thereby provides an adjustable strap which encircles and is connected to the foot of the rider about the instep. The connection of the second component with the foot of the rider will cause the pedal to be raised when the foot of the cyclist is raised. This is a particularly important factor for racers, since such toe clips make it possible for the cyclist, in addition to pushing down, to pull upwards on the pedal. This increases the power a rider can apply to the bicycle, and is especially important in sprint situations. It is thus seen, that as a result of the use of toe clips, bicycles can be made to operate more efficiently.

Toe clips also help riders to avoid possible injuries of the type that would occur when the foot of the rider slips off of the pedal. Depending on the amount of power being applied to the pedal at the time that such a slip occurs, this can result in an injury to the shin of a rider by the bicycle pedal, sudden contact between the top horizontal bar of the bicycle and the crotch of the rider, a fall from the bicycle, or various combinations of all the above. Therefore, such toe clip mechanisms are generally considered a necessity by all bicycle racers and most serious bicycle riders.

As a result of the attachment of toe clips to bicycle pedals, the combined assembly of the pedal and toe clip has a decided amount of top heaviness. Because of this, when a bicycle pedal having a toe clip attached to it is not engaged by the foot of a cyclist, the top heavy pedal generally orients itself in an attitude in which the forward edge of the pedal turns downwardly, with the top surface of the pedal at an angle to the horizontal. While in this attitude the toe clip is situated to the front of and below the axle which carries the pedal, thereby making the entry of the toe of a rider to the open end of the top clip difficult. As a result of the above imbalance, considerable inconvenience is encountered by a cyclist when he or she attempts to place his or her shoe on a conventional pedal to which a toe clip is attached. Since the toe clip and pedal are substantially inverted with respect to their preferred position of operation, before engaging the pedal the cyclist must first return the pedal to its proper substantially horizontal attitude of use. This is usually accomplished by first engaging the trailing edge of the mis-oriented pedal and toe clip structure with the toe and sole portion of the shoe, and then rolling the pedal backwards to orient the pedal to a substantially horizontal attitude at which the cyclist can properly engage the pedal and toe clip. When initiating this procedure from a standing start, a cyclist will usually first easily put one foot in the toe clip of the near side pedal, and then initiate either a coasting movement of the bicycle or complete a portion of a pedal stroke to provide enough forward momentum to cause the bicycle to coast. As a result of this, the engaged pedal is normally located in a substantially down position, and the non-engaged pedal is in a substantially up and forwardly tilted position at which an attempt can be made to enter the second toe clip and pedal with the second foot. Getting the foot into the second toe clip and pedal is more difficult, and may constitute an action requiring more dexterity than many cyclists can easily muster. As a matter of fact, the degree of difficulty of such a maneuver is sufficiently intimidating to keep many riders from using toe clips.

A rider, while stopping and dismounting, will typically leave the bicycle pedal crank arms in a substantially vertical alignment. To swing one leg over a bicycle, as is necessary when dismounting, most riders hold the handlebars firmly, lift their posterior off the seat, stand up with their weight on one leg on one pedal, and swing the other leg over the bicycle frame either behind or forward of the seat, while at the same time coming to a stop. In standing on one leg, the pedal and associated toe clip and crank on that side is forced to the bottom of its stroke. This positions the crank arms in a substantially vertical alignment. The last foot which the rider removes from the bicycle will typically be from the lower pedal. To start riding again, the rider must substantially reverse the process. When using a bicycle equipped with toe clips and with easy terrain ahead, most riders will place their first foot in the lower pedal, push off and coast, concentrate on orienting the second pedal, and then position their second foot on the upper pedal in the toe clip assembly. Alternatively if the terrain is more difficult, and a partial pedal stroke is needed to provide a faster coasting speed, the rider will insert the first foot at the lower position, pull up and forward on the toe clip until the pedal is near, but still forward of top dead center, push off while pedalling with the first foot for approximately one half stroke, concentrate on orienting the second pedal, and then insert the second foot on the second pedal in its toe clip assembly. A third method is used where the terrain is even more difficult. In the third method the first foot is inserted on the first pedal and in its toe clip, the second foot is placed on the back side of the other pedal, and the bicycle is pedalled until sufficient speed is obtained so that a moment can be devoted, while coasting, to concentrate on orienting the second pedal and into the second toe clip. Experience has shown that a cyclist who has his or her feet on the ground, or who has disengaged his or her foot from one or both of the pedals to avoid falling, frequently loses a substantial amount of productive effort and time while reorienting the pedals so that they can properly receive the foot. Moreover, during such an interval when the cyclist is reorienting the pedal to return it to its reentry and operating attitude, not only is the cyclist prevented from exerting full useful effort in propelling the bicycle, but in addition his or her attention may be dangerously distracted from the path which is being travelled. This may, in turn, limit the cyclists ability to maneuver the bicycle. Consequently, a condition of considerable instability and potential danger may occur.

Heretofore, one way of alleviating the above-identified problem of mis-oriented pedals and toe clips has been through the use of a counterweight to balance the weight of the toe clip. Known examples of such counterweight arrangements are set forth and illustrated in U.S. Pat. Nos. 553,638, 614,856; 622,543; 643,896; 651,084; and 1,834,296. While the counterweight arrangements of these references appear to alleviated the initial attitude and orientation problem of the toe clip and pedal combination, such solutions do not necessarily alleviate all of the difficulties, and in some instances cause new problems. When light weight counterweights are used, during dynamic situations the bicycle pedal will tend to rotate around its axle to an even greater degree than would occur without such counterweights. This complicates the orienting of the foot of the rider to the pedal. To overcome this tendency, the counterweight on the bottom of the pedal is generally quite heavy, thereby adding substantial undesirable weight to the bicycle. Furthermore, clearance beneath the pedals is an important factor, particularly in the use of mountain bikes. The addition of large counterweights below the pedals can cause problems by providing a projection which may catch on terrain such as rocks and shrubs. As a result of the foregoing considerations, it is seen that counterweights on pedals may provide so much unnecessary and unneeded interference and weight, that the only current application of such counterweights is on stationary exercise bicycles for which weight is not a concern.

Another solution to the problem of mis-oriented pedals and toe clips is disclosed in U.S. Pat. No. 605,536. This reference teaches a side clip in lieu of a toe clip arrangement. While the side clip will generally orient the pedal in the appropriate attitude due to its weight arrangement, a portion of this side clip hangs beneath the pedal, thereby reducing bottom clearance and posing potential problems of snaring rocks, shrubs and other items on the ground.

U.S. Pat. No. 4,103,563 describes yet another solution to the problem of bicycle toe clip and pedal orientation. In this particular reference, the bicycle pedal has a magnetic connection between the pedal and the pedal crank. This magnetic connection is intended to orient the upper surface of the pedal in a substantially horizontal position when the pedal has turned through an angle of approximately 90° beyond a top dead center (TDC) position of the crank, that is with the crank is in a substantially horizontal position. This presents the rider with an awkward entry position as he or she cannot rest a portion of his or her weight on the opposite pedal foot if the crank arms are to be held horizontal. Also, such magnetic connections are, by their very nature, weak, tenuous and easily broken. An additional problem with magnetic connections is particularly pertinent to mountain bike usage. Mountain bikes tend to function in a harsh environment including muddy and dusty roads. Since magnetic connections require precise alignment for strong attraction, and since such alignment may be interfered with by diamagnetic materials such as dirt, mud and the like, the alignment may be interfered with. Thus, such environmental factors could prevent satisfactory operation of this prior art magnetic orientation device.

Finally, many of these prior art devices are, of necessity, "factory equipment" which would be difficult to easily retro-fit on the pedals of the large number of existing bicycles.

Such a device would function best if it could be associated with both pedals, and would hold both the first pedal, as well as the second pedal in the correct, but different orientations, as needed. In parent U.S. patent application Ser. No. 293,294, entitled "Orientation Device For A Bicycle Pedal" filed on Jan. 4, 1989, and in many other prototype devices of the present invention, provision was made for easy entry to the second pedal, but the mechanism had the potential to make entry of the first foot onto the first pedal more difficult. These solutions caused a problem by sometimes holding the first pedal and toe clip upside down when the first crank arm was down. Thus, it has been determined that there is a need for a single device that can correctly orient both the first (lower) and second (upper) pedal into their proper, but different orientation positions.

It can thus be seen that there still remains a need for a simple, yet effective and stable mechanical arrangement for orienting a bicycle pedal, especially one having a toe clip, such that the upper surface of the pedal is in a proper attitude, orientated for easy engagement by the foot of a cyclist. Furthermore, any such device should, of necessity, be light weight and be of a design in which a minimal or no amount of clearance beneath the pedal is lost. For safety reasons it would need to avoid any interference with or obstacle to the rapid or emergency removal of the foot from the toe clip, for example, in the midst of a fall. It is further seen that it would also be desirable to have a light weight, simple, safe, yet effective and stable yet disengagable mechanical arrangement for orienting both the first (lower) and second (upper) pedal, especially one having a toe clip, which device would provide substantially no interference with the clearance beneath the pedal, and yet be easily retro-fitted on existing pedals. Finally, there is a need for such a device which is capable of being easily installed as either "factory equipment," or easily retro-fitted on existing bicycle pedals.

SUMMARY OF THE INVENTION

Accordingly, it is one object of the present invention to provide a mechanical device for providing a stable disengagable mechanical arrangement for orienting the pedals of a bicycle.

Another object of the present invention is to provide a mechanical device which orients a bicycle pedal in a manner which permits easy placement of the shoe of a cyclist onto the top surface of the pedal.

It is another object of the present invention to provide a mechanical device to offset the weight imbalance caused to the pedals of a bicycled by a toe clip associated with each pedal so that the upper surface and toe clip of each pedal is in a proper attitude, oriented for easy engagement by the foot of a cyclist.

It is yet another object of the present invention to provide such a system which functions to orient both the first (lower) and second (upper) pedals to which a toe clip is attached.

It is still yet another object of the present invention to provide a mechanical pedal orienting device which is light in weight, and which can be applied with ease to the pedals of a new or of a existing bicycle.

It is yet another object of the present invention to provide such a pedal orienting system which does not substantially interfere with the clearance beneath the pedals of a bicycle.

It is another object of the present invention to provide a mechanical pedal orienting device which is sufficiently stable to prevent random spinning of a pedal, yet which pedal orienting device is capable of being easily disengaged by a cyclist to allow normal pedal rotation.

It is a still further object to provide such a pedal orienting system which avoids any interference with or obstacle to the rapid or emergency removal of the foot from the toe clip, for example, in the midst of a fall.

Another object of the present invention is to provide a mechanical device for orienting a bicycle pedal, which device is inexpensive, and simple in construction and design.

The foregoing objects are obtained by providing, in according with the teaching of the present invention, a mechanical device for orienting a bicycle pedal which pedal is rotatably secured to a rotary crank for rotation with the rotary crank during the operation of the bicycle. The improvement of the present invention is comprised of such a pedal orienting device which includes a cam that can be adjustably secured to each axle to which the pedal is rotatably secured. The cam is located on the pedal axle intermediate the pedal and the rotary crank. The cam carries and defines at least one detent. The device also includes a latch mechanism which carries a pawl for mechanically releasably engaging the one or more detent which is defined in the cam. The one or more detent which is carried by the cam is designed to be located and positioned so that, in conjunction with the pawl which is carried by the latch mechanism, it can orient the pedal in one or more desired position.

In preferred embodiments a mechanism is provided for normally biasing the pawl of the latch mechanism toward its engagement position with the detent of the cam. In operation, when the latch pawl engages a detent in the cam it limits rotation of the pedal in a manner which orients the pedal in one or more predetermined position. The preferred fixed orientation of the pedal by the cam detent and pawl is with the pedal in a substantially horizontal position, with the upper surface of the pedal "up" when the crank is in a substantially top dead center (TDC) position. A mechanism is also provided to easily disengage the pawl of the latch from the cam detent. The disengaging mechanism is operatively connected to the latch mechanism. When the pawl is disengaged from the cam detent, free rotation of the pedal on its axle relative to the rotary crank is permitted. The latch disengaging mechanism is activated, for example, when the foot of a cyclist is placed on the upper surface of the pedal.

In preferred embodiments two diametrically opposed cam detents are provided. This allows two preferred fixed orientations of the pedal by the cam detent and pawl. One such preferred fixed orientation is with the upper surface of the pedal being substantially horizontal, that is with the upper surface "up" when the crank is in a substantially top dead center (TDC) position. A second such preferred fixed orientation is with the upper surface of the pedal being substantially horizontal, that is with the upper surface "up" when the crank is in a substantially bottom dead center (BDC) position.

In one embodiment, the system of the present invention would be built as an integral part of a pedal and pedal axle system. In such a system the latching mechanism, the disengagement mechanism and the cam would be integral with or attached directly to the pedal, rather than retro-fitted thereto. In another embodiment, the system of the present invention would be built in a manner which would allow it to be retro-fitted to substantially any existing bicycle pedal.

As is set forth in greater detail below, the system of the present invention to provide a mechanical pedal orienting device which is light in weight, and which is inexpensive, and simple in construction and design. Furthermore, the system of the present invention does not substantially interfere with the clearance beneath the pedals of a bicycle, which provides a mechanical pedal orienting device which is sufficiently stable to prevent random spinning of a pedal, yet which pedal orienting device is capable of being easily disengaged by a cyclist to allow normal pedal rotation. Additionally, the system of the present invention avoids any interference with or obstacle to the rapid or emergency removal of the foot from the toe clip, for example, in the midst of a fall.

BRIEF DESCRIPTION OF THE DRAWINGS

The accompanying drawings illustrate complete preferred embodiments of the present invention according to the best modes presently devised for the practical application of the principles thereof, and in which.

DETAILED DESCRIPTION OF THE PREFERRED EMBODIMENT

Figure 1:
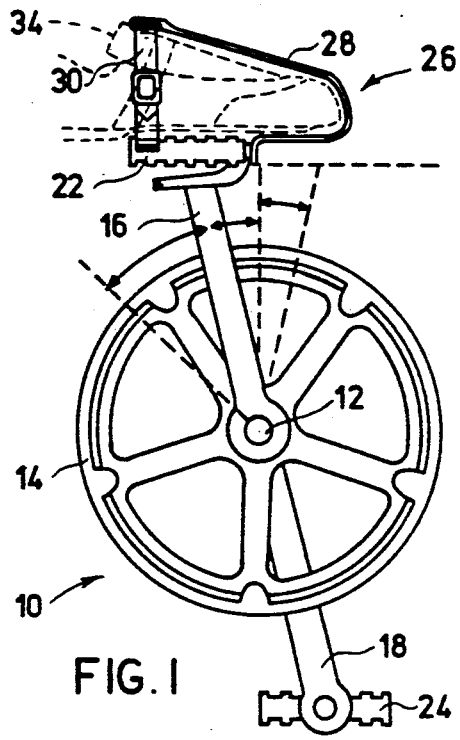
FIG. 1 is a side elevational schematic of a bicycle pedal and pedal crank arrangement illustrating the orientation of the pedal when the crank is at a substantially top dead center position as the pedal is acted upon by the mechanical orienting device of the present invention, while also illustrating the orientation of the pedal with respect to the foot of a cyclist.

Referring first to FIG. 1, a side elevational schematic of a bicycle drive system, generally 10, is illustrated as it would be carried by a bicycle, not shown. Typical of such bicycle pedal arrangements, the system includes a drive shaft 12 which is supported for rotation by a bearing structure, not shown, carried by the lower part of a bicycle frame, which is also not shown. Drive shaft 12 fixedly carries at one end any art known single or multiple sprocket gear 14. As is universally known, the teeth of sprocket gear wheel 14 engage a chain, not shown, which transmits power to a second sprocket gear wheel, and thence to the drive wheel of the bicycle, also not shown. The opposed ends of drive shaft 12 are connected to and support a pair of radially opposed rotary cranks 16 and 18 which together form a rotary crank assembly. Each of the cranks 16 and 18 carries at its distal free end a short axle 20 which projects horizontally outwardly away from the bicycle, substantially parallel to drive shaft 12. Axles 20 project from cranks 16 and 18, and support pedals 22 and 24, respectively, in a manner which allows their free rotary movement about the axles. Typically, ball bearings, not shown, are provided between tubular inner walls of pedals 22 and 24 and axles 20 to promote such free rotation.

Each pedal 22 is illustrated as being provided with a conventional toe clip, generally 26, which in the illustrated embodiment includes a clip portion 28 and a flexible transverse strap 30. Each clip 28 is mounted at one end to a front part of pedal 22 while forming an extension of upper supporting surface of pedal 22. Clip 28 is then curved upwardly and rearwardly so as to be capable of enveloping toe region 32 of shoe 34 of a cyclist. Clip 28 terminates in a connecting loop through which flexible strap 30 passes, strap 30 itself being fastened across or even beneath pedal 22 at the region of the rear part thereof.

The normal position of use of pedal assembly 22 and toe clip 26, is with pedal 22 is in a substantially horizontal attitude and the upper surface of pedal 22 directed substantially upwardly, and with toe clip 26 having its opening directed rearwardly, as indicated in FIGS. 1, 2, 3 and 5. However, the combination of pedal assembly 22 and toe clip 26 has a center of gravity situated at an elevation higher than axle 20 which carries each pedal when pedal 22 is in its normal position of use. As a result of this top heavy structure, each pedal 22 and toe clip 26 combination, when not engaged by the foot of a cyclist, will tend to assume an unbalanced position which is substantially inverted with respect to its preferred operating position illustrated in FIG. 1. Thus, while in FIG. 1, pedal 22 is shown in an upright position of use due to the fact that it is engaged by shoe 34 of a cyclist, when the foot of a cyclist does not engage pedal 22, and in the absence of a stabilizing device, for example of the type taught by the present invention, pedal 22 will tend to assume a toe down inverted position. In such an inverted position, toe clip 26 tends to be inclined at an angle, for example of approximately 30°-40° below the horizontal plane. When in this position of non-use, the opening into toe clip structure 26 is directed upwardly rather than rearwardly, thereby making shoe entry difficult, as detailed above. Thus, each pedal 22 and toe clip 26 combination, when not engaged by shoe 34 of a cyclist, and when not stabilized by a mechanism of the type disclosed by the present invention, will tend to assume, due to the high center of gravity of the combination, a position inclined downwardly at an angle which frustrates insertion of shoe 34 into toe clip 26 and onto pedal 22.

It is thus apparent that a cyclist who has stopped the travel of a bicycle and has his or her feet on the ground, or who has disengaged a foot from a pedal for any reason will tend to encounter considerable difficulty in quickly placing his or her shoe back into operative equipment with the surface of a pedal 22 and the toe region of the shoe into the toe clip 26. Such a cyclist must first return pedal 22 to its substantially horizontal attitude of normal use with the upper surface up and the opening to the toe clip 26 rearwardly, and then, while maintaining it in this unstable orientation, place his or her foot on the pedal and into the toe clip. The present invention avoids the problems described above while providing a structure which fixes the position of bicycle pedal and toe clip when the pedal is not engaged by the shoe of an operator.

Figure 2:
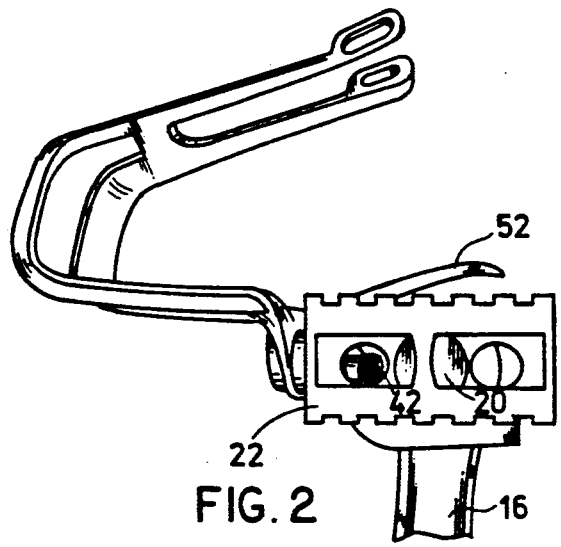
FIG. 2 is an outside elevational schematic of one preferred embodiment of the orienting mechanism of the present invention shown as an integral part of a left bicycle pedal which is carrying a toe clip.
Figure 3:
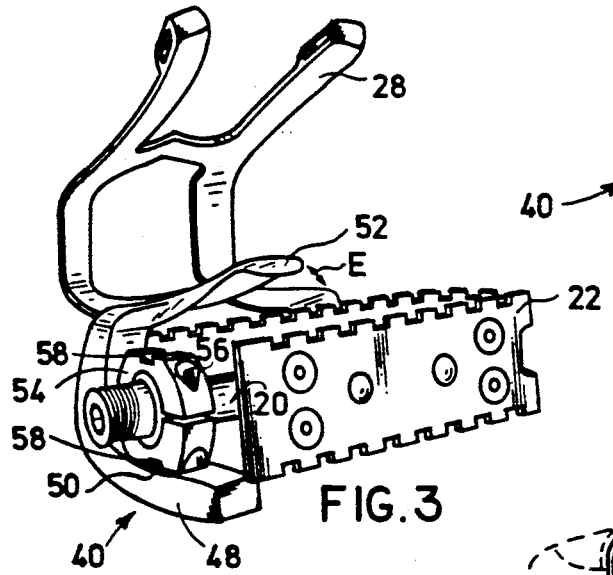
FIG. 3 is an inside rear perspective view of the type of device illustrated in FIG. 2, but mounted on a left bicycle pedal which is carrying a toe clip, and showing the orienting mechanism of the present invention in its normal, biased state with the pawl of the latching mechanism in engagement with the lower detent of the cam to orient the pedal with respect to the crank.
Figure 5:
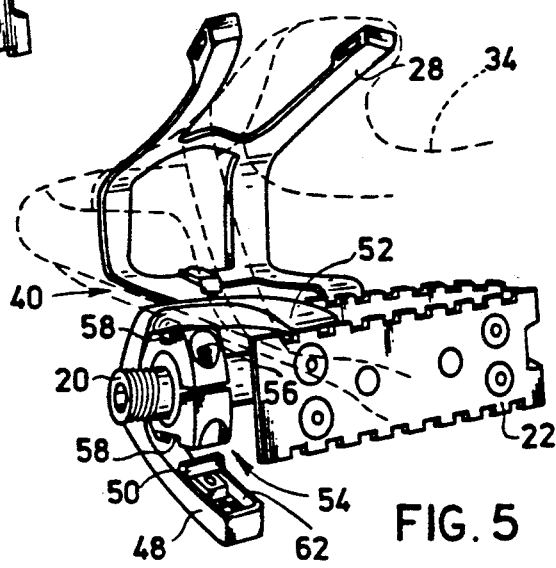
FIG. 5 is an inside rear perspective view, similar to FIG. 3, but showing the orienting mechanism of the present invention in its disengaged state as a result of the action of the shoe of a cyclist, shown in phantom, on the disengaging mechanism so that the pawl of the latching mechanism is disengaged from the lower detent of the cam so that the pedal is free to rotate with respect to the crank.
Figure 8:
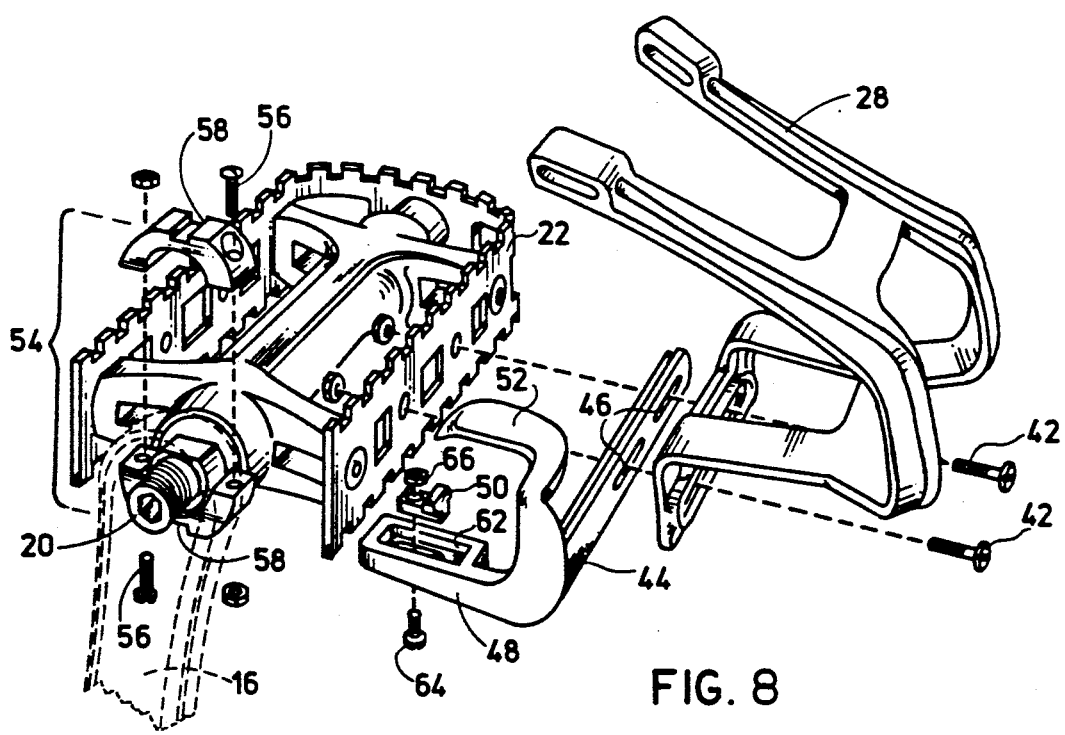
FIG. 8 shows an exploded perspective view of the mechanism of the present invention in relation to a pedal axle and pedal, a toe clip, and a rotary crank which is shown in phantom.

Referring now to FIGS. 2, 3 and 5, the pedal orientation device of the present invention, generally 40, is shown secured on axle 16, intermediate pedal 22 and rotary crank 18. Pedal 22 is attached to the distal end of rotary crank arm 18 by axle 20. Pedal 22 is normally freely rotatable about axle 20 as rotary crank arm 18 rotates around drive shaft 12. Both a conventional toe clip 26 and pedal orientation device 40 are shown in FIG. 8 as being conveniently secured to the forward face of pedal 22 by bolts 42, although pedal orientation device 40 could be secured to other parts of pedal 22. Pedal orientation device 40 includes a mounting plate or flange, generally 44, having a plurality of slots 46 which are adapted to receive bolts 42. Although bolts 42 pass through slots 46 and securely fix mounting plate or flange 44, which carries pedal orientation device 40, to pedal 22, slots 46 allow for a degree of transverse adjustment.

Pedal orientation device 40 includes a latch mechanism in the form of a latch arm 48 and a release lever 52, both of which are carried by mounting plate 44. In fact, for the purposes of the present operation, latch arm 48 and release lever 52 may be either a single element or a pair of elements. The distal end of latch arm 48 in turn includes an adjustable pawl member 50. Now, as most clearly illustrated in FIG. 8, an engaging mechanism 54 is adjustably secured intermediate pedal 22 and rotary crank 16. In this case, engaging mechanism 54 is secured to axle 20 of the pedal 22 by bolts 56, although any type of fastening mechanism may be utilized for this purpose. In the preferred embodiment, engaging mechanism 54 includes a pair of detents 58 which are positioned and designed for releasably receiving pawl member 50. Pawl member 50 is designed to engage one of the detents 58 which is carried and defined by engaging mechanism 54. Detents 58 are located in such a manner that, when crank 16 is rotated to its substantially top dead center position relative to the bicycle, detents 58 will releasably receives pawl member 50 in a manner such that the upper surface of pedal 22 is oriented in a substantially horizontal attitude.

Figure 4:
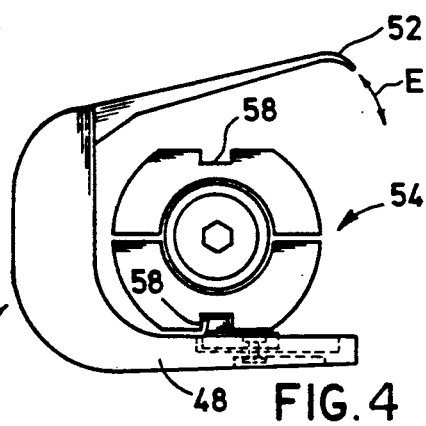
FIG. 4 is an enlarged side elevational schematic view of the latching and engagement mechanism of FIG. 3, shown in relation to a pedal axle.

Latch arm 48 and release lever 52 are designed and attached to pedal 22 in such a manner latch arm 48 is normally urged or biased towards and into contact with engaging mechanism 54 in such a manner that pawl 50 carried by arm 48 engages one of the detents 58, and forms a stable latching connection with engaging mechanism 54. This in turn stabilizes pedal 22 which is connected thereto by means of mounting plate or flange 44. Thus, the latch 48 and lever 52 combination, as illustrated at FIGS. 3 and 4 represent the normal position of the present invention when it is mounted on a pedal which is connected to the crank of a bicycle, and release lever 52 is not engaged by the foot of the rider. In this manner, the weight of toe clip 26 at the front end of pedal 22 is overcome by the mechanical engagement of latch arm 48 and pawl 50 with detent 58 carried by engaging mechanism 54. As a result, attached pedal 22 is maintained in a fixed position relative to rotary crank arm 16 as crank arm 16 proceeds throughout a full revolution as illustrated in FIG. 7, and discussed below.

Figure 6:
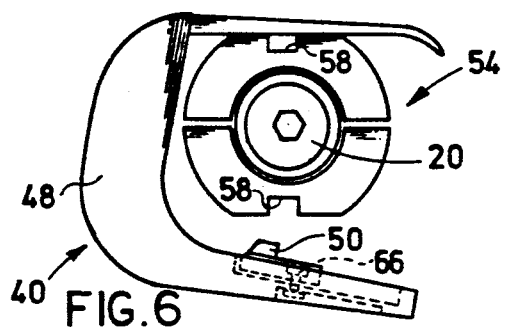
FIG. 6 is a side schematic view of the latching and engagement of FIG. 5 showing the orienting mechanism of the present invention in its disengaged state as a result of the action of the shoe of a cyclist on the disengaging mechanism, shown in relation to a pedal axle.

In the embodiments shown, release lever 52 is secured to latch arm 48 in such a manner, that when pressure is applied to lever 52, latch arm 48 and pawl 50 is biased out of engagement with engaging mechanism 54. As illustrated at FIGS. 1, 5 and 6, when the foot of a cyclist is placed onto pedal 22 and within toe clip 26, the motion and positioning of the bottom area of the toe region 32 of shoe 34 forces release lever 52 in the direction of arrow E to the position indicated at FIG. 6. Downward movement on release lever 52 is normally generated by the pressure from the shoe of a cyclist against the top of lever 52. This downward motion of release lever 52 causes latch arm 48, to which it is connected, to also rotate downward. Thus, pawl 50, which is supported by and connected to latch arm 48, is also moved downward and is caused to be mechanically disengaged from engaging mechanism 54, thereby permitting pedal 22 to freely rotate about axle 20. As shown, in preferred embodiments of the present invention, release lever 52 has a gently curved distal end which helps to serve to prevent it from inadvertently catching or hooking any portion of the shoe of a rider, such as a lug on the sole of the shoe.

The embodiment illustrated in FIGS. 1, 2, 5 and 6, show pedal orientation device 40 after it has been contacted by the foot of a cyclist to disengage latch 48 and pawl 50 from engaging mechanism 54. As can be most clearly seen in FIGS. 5 and 6, when the foot of a cyclist engages lever 52, lever 52 moves in the direction indicated by arrow E and thus disengages from engaging mechanism 54 of the prior embodiment. Once the foot of a cyclist is removed from pedal 22, latch 48 and pawl 50 are urged back into latching contact with engaging mechanism 54.

Figure 7:
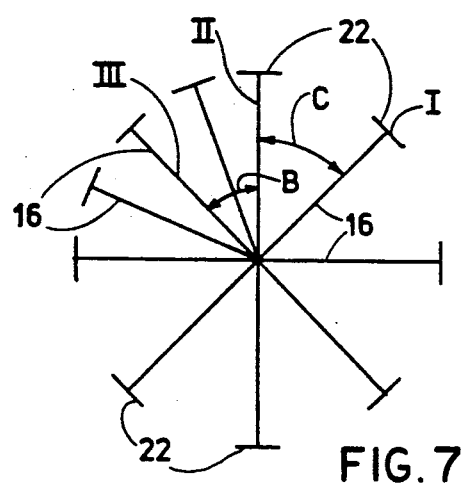
FIG. 7 diagrammatically illustrates the angular relationship of the pedal crank and bicycle pedal as the pedal is acted upon by the mechanical orienting device of the present invention with the crank located at various positions during its rotation.

Referring now to FIG. 7, there is diagrammatically illustrated, by the means of a series of radial lines, the angular relationship of crank arm 16 and bicycle pedal 22 as the pedal is acted upon by the mechanical orienting device 40 of the present invention, and with crank 16 located at various positions during its rotation about shaft 12. Pedal 22 is illustrated in the fixed right angle position that it will assume with respect to crank arm 16 when pawl 50 is positioned in a detent 58. In the most preferred embodiment pedal 22 and any toe clip 26 associated therewith are at slight forward and downward position to permit ease of insertion of the foot onto pedal 22 and the toe into toe clip 26 when crank 16 is in about plus or minus 45° of top dead center (TDC). As illustrated, top dead center (TDC) is the position at which pedal 22 is at its highest or uppermost point in the revolution made by crank 16. Pedal 22 is fixed relative to crank arm 16 by orientation device 40 in a manner such that pedal 22 is substantially horizontal during that portion of the revolution of crank arm 16 which is the position at which a cyclist will insert his or her foot on to pedal 22. As further illustrated in FIG. 7, the lower most preferred point where a cyclist may still easily insert his or her foot on to pedal 22 is indicated by a position I, with the top dead center (TDC) position being indicated by II, and the forward most preferred position being indicated by III. The preferred angle B between positions II and III is approximately 45°, while angle C between II and I is preferably approximately 45°. Thus, the useful arc of contact with the foot of a cyclist and insertion onto pedal 22 is approximately 90°, as indicated by arrow D. It is throughout this 90° sweep that the plane made by foot pedal 22 is sufficiently substantially horizontal to allow ease of contact and insertion by the foot and toe.

Pedal orientation device 40 of the present invention may be integrally manufactured as a part of a pedal. Also, as shown, it may be made as a separate device mountable to any number of bicycle pedal arrangements. However, many types of bicycle pedals are available in many different sizes. Also, many different bicycles exist which have different distances between pedal 22 and crank 16. Therefore, for ease of retro-fitting the mechanism of the present invention to as many such pedals and bicycles as possible, pedal orientation device 40 must be adjustable. As noted above, pedal orientation device 40 includes a mounting plate or flange, generally 44, having a plurality of slots 46 which are adapted to receive bolts 42. Since most pedals are designed to receive toe clips at their leading edges, they include bolt holes. Bolts 42 pass through slots 46 into the bolt holes at the leading edge of pedal 22, and securely fix mounting plate or flange 44, which carries pedal orientation device 40, to pedal 22. Slots 46 are elongated in order to permit laterally adjustable mounting of plate or flange 44, and thus of device 40, along the forward face of pedal 22. This allows the system to accommodate different sizes of pedals 22 and arrangements of rotary cranks 16, thereby making the use of a single standard device capable of being retrofitted to most existing bicycle pedals. As most clearly shown in FIG. 7, latch 48 defines a channel 62 for receiving pawl 50. Channel 62 is elongated in order to permit pawl 50 to be moved laterally, and thereby makes the position of pawl 50 adjustable, using bolt 64 and nut 66 to secure it in a desired position, for pedals of various widths. Consequently, the present invention is suitably mounted to any number of different bicycle pedals and to many different distances between pedal 22 and crank 16.

When constructed of suitable strong and durable plastic materials, such as polycarbonate or acetal, pedal orientation device 40 has a total weight of less than one ounce (approximately 26 grams per pedal, or less). This is considerably lighter than other orientation devices. However, the present invention is not limited to any specific material or choice of materials.

As can be seen from the above, a simple yet effective mechanical device arrangement has been provided which fixes the orientation of a bicycle pedal relative to an engaging mechanism when a cyclist's foot is not engaged with the bicycle pedal. This is particularly important when the bicycle pedal includes a toe clip which requires careful entry by the shoe of a cyclist. The preferred position of entry into such a toe clip arrangement is that the upper portion of the crank cycle, and in particular ranges from about 45° forward of top dead center to 45° rearward of top dead center. This is the most preferred position for entry of a cyclist's foot into a pedal and toe clip combination. The present invention allows the proper orientation in a fixed position for such toe clip and pedal combinations during this preferred entry phase, thereby avoiding the need for careful manipulation of an inverted pedal in order to get a foot into a toe clip as required in the past. The present invention also provides for such orientation without adding significant weight to the bicycle, and without placing substantial added material at the lower surface of the bicycle pedal, thereby avoiding any substantial reduction in clearance from the bicycle pedal to the ground surface. The latter aspect of the invention is particularly important to mountain bikes as described above. Moreover, since the present device is a mechanical attachment mechanism, it is particularly useful to mountain bikes which undergo significant abuse in rough terrain and severe environments, a situation which is not conducive to permitting magnetic means or other more sophisticated attachment/orientation mechanisms to function well. The present invention is also simple to manufacture, easy to assemble and inexpensive. Finally, the invention is readily adaptable to be retro-fitted on bicycles and bicycle pedals of various sizes and constructions, and of a wide variety of types due to the adjustable mechanisms built into the device.

While the invention has been particularly shown, described and illustrated in detail with reference to preferred embodiments and modifications thereof, it should be understood by those skilled in the art that the foregoing and other modifications are exemplary only, and that equivalent changes in form and detail may be made therein without departing from the true spirit and scope of the invention as claimed, except as precluded by the prior art.

The embodiments of the invention in which an exclusive property or privilege is claimed are defined as follows:

1. A device for orienting a bicycle pedal which is carried by a bicycle crank, said bicycle crank having a first and second distal end, such said crank being connected at its said first distal end to a drive element on a bicycle, said bicycle pedal having a front end and an upper surface, which said upper surface is adapted to be engaged by the shoe of a cyclist during the operation of said bicycle, wherein such a cyclist shoe includes a sole and a toe portion, said bicycle pedal being rotatably mounted on an axle, said axle to which said bicycle pedal is rotatably mounted being secured substantially adjacent to said second distal end of said rotary crank for rotation with that rotary crank, wherein the improvement includes, in combination:

a means for being mechanically engaged, said mechanical engaging means being designed and adapted to be adjustably secured on said bicycle intermediate one of said bicycle pedals and said rotary rank to which said axle which carries that bicycle pedal is to be secured, wherein said mechanical engaging means includes a cam, said cam carrying and defining at least one detent mechanism;

a means for mechanically latching, said mechanical latching means adapted to be carried by a bicycle pedal, and when so attached and carried, designed to releasably mechanically engage said mechanical engaging means to thereby limit rotation of said bicycle pedal with which said latching means is associated relative to the crank to which the axle which carries said bicycle pedal is secured, and wherein further said mechanical latching means includes an arm, which said arm carries a pawl element, said combined arm and pawl being designed to normally project towards and releasably mechanically engage said mechanical engaging means when said latching means is attached to said bicycled pedal carried by a bicycle; whereby, when said latching means mechanically engages said mechanical engaging means, said upper surface of said bicycle pedal can be oriented in a substantially fixed predetermined position relative to its said crank;

each said detent mechanism carried by said cam being designed and adapted for releasably receiving said pawl element carried by said arm of said mechanical engaging means;

means for mounting said mechanical latching means to the front of said bicycle pedal, said mounting means including a plate having an attachment mechanism which is adapted to be attached to the front of said bicycle pedal, said attachment mechanism also having means for laterally adjusting the position of said mechanical latching means relative to bicycle pedal, said mounting means being securely connected to said latching means; and means for mechanically disengaging said mechanical latching means from said mechanical engagement means when contacted by said shoe of a cyclist during the operation of said bicycle to permit free rotation of said pedal relative to its said crank, said disengaging means being operably linked to said mechanical latching means.

2. The orienting device of claim 1, wherein means for mechanically biasing said latch means toward said mechanical engagement position with said mechanical engagement means are operatively associated with said latching means.

3. The orienting device of claim 1, wherein said mechanical latching means and said mechanical engagement means are designed, located and positioned in a manner such, that when the rotary crank to which the axle which carries that pedal is secured, is rotated to its substantially top dead center position relative to the bicycle, then the upper surface of the pedal is oriented in a substantially horizontal attitude.

4. The orienting device of claim 1, wherein, when said crank is rotated to its substantially bottom dead center position, relative to the bicycle, then said upper surface of the pedal is oriented in a substantially horizontal attitude.

5. The orienting device of claim 3, wherein said pedal further includes a toe clip designed to extend about the toe region of the upper surface of the pedal to receive the toe portion of the shoe of a cyclist, the weight and location of the toe clip normally being sufficient to cause gravity to orient the upper surface of the pedal in a substantially downwardly facing attitude, wherein the improvement further includes the ability of said mechanical latching means to engage said mechanical engagement means to offset the weight of the toe clip to substantially fix the position of the upper surface of the pedal at a substantially right angle position relative to the crank when the crank is rotated to its substantially top dead center position relative to the bicycle, thereby enabling easy access by the shoe of a cyclist onto the upper surface of the pedal and into said toe clip.

6. The orienting device of claim 1, wherein said disengaging means includes said swingable lever arm which, when said mechanical latching means is attached to said bicycle pedal, said swingable lever normally projects over the upper surface of the pedal in a position at which it will be contacted by and swung downwardly toward the upper surface of the pedal by the shoe of a cyclist to thereby cause said mechanical latching means to become disengaged from said mechanical engaging means when the shoe of a cyclist is operatively positioned on the upper surface of the pedal.

7. The orienting device of claim 6, wherein said latching means and said disengaging means are a single element.

8. The orienting device of claim 1, wherein said means for engagement is designed to be secured to the axle which rotatably carries the pedal.

9. The orienting device of claim 1, wherein said means for engagement is an integral part of the pedal axle.

10. The orienting device of claim 1, wherein said latching means is an integral part of the pedal.

11. The orienting device of claim 1, wherein said means for engagement is an integral part of the pedal axle, and wherein further, said latching means is an integral part of the pedal.

* * * * *